United States Patent [19]

Rusnak

[11] Patent Number: 4,530,486
[45] Date of Patent: Jul. 23, 1985

[54] VALVE

[75] Inventor: Miro Rusnak, LaVerne, Calif.

[73] Assignee: City of Hope National Medical Center, Duarte, Calif.

[21] Appl. No.: 465,245

[22] Filed: Feb. 9, 1983

[51] Int. Cl.³ .......................... F16K 31/06; F16K 1/38
[52] U.S. Cl. .................... 251/129; 251/120; 251/145; 251/335.2; 251/368
[58] Field of Search ............... 251/368, 129, 335 A, 251/120, 145; 137/606, 509

[56] References Cited

U.S. PATENT DOCUMENTS

| | | |
|---|---|---|
| 2,644,662 | 7/1953 | Powers . |
| 2,725,212 | 11/1955 | Jensen . |
| 2,732,859 | 1/1956 | Chace . |
| 3,013,767 | 12/1961 | De Haven . |
| 3,201,937 | 8/1965 | McKee . |
| 3,317,184 | 5/1967 | Usry . |
| 3,329,166 | 7/1967 | Kiernan ........................ 251/368 X |
| 3,583,439 | 6/1971 | Dolenz et al. ................. 251/145 X |
| 3,782,241 | 1/1974 | Ashley ......................... 137/509 X |
| 4,047,695 | 9/1973 | Cleveland et al. . |
| 4,232,696 | 11/1980 | Burris et al. ................... 251/335 A |
| 4,311,170 | 1/1982 | Dolan . |
| 4,437,481 | 3/1984 | Chamberlin et al. ............... 251/368 |

Primary Examiner—Arnold Rosenthal
Attorney, Agent, or Firm—Edward D. O'Brian; K. H. Boswell

[57] ABSTRACT

A valve which is primarily useful in avoiding liquid being held or trapped around the exterior of a closure member used to close off the flow from an inlet to an outlet cavity through an opening after having been positioned so as to permit such flow can be constructed so that the terminal surface on the closure member appears as a continuation of the internal surface of the outlet cavity around the opening when the closure member is in this closed position. Preferably, the outlet cavity is a cylindrical bore and the terminal surface of the closure member is a cylindrical surface having the same diameter as the bore. When the outlet cavity and the terminal surface are so shaped, a guide structure is used to control the movement of the valve closure member so that it can only be located in a closed position in which the cylindrical surface appears as a part of the cylindrical bore. Preferably, the valve seat and the closure member are formed of different inert polymer materials having different hardnesses and a spring is provided for biasing the closure member against the valve seat when it is in the closed position so that some cold flow will take place in the softer of the two materials in order to achieve an acceptable seal.

2 Claims, 3 Drawing Figures

VALVE

The invention set forth in this specification pertains to new and improved valves. More specifically, it is directed towards valves which are primarily useful because they are constructed so that liquid cannot be caught or held around the exterior of a closure member in the valve when the closure member is positioned in the closed position so as to block flow in the valve from an inlet cavity to an outlet cavity.

It is, of course, a matter of common knowledge that many thousands of different types of valves have been made and used in many diverse applications. In spite of this, it is considered that there is a need for new and improved valves which can be utilized so as to avoid contamination or related undesirable consequences resulting from the presence of a material around the periphery of a closure member in the outlet chamber within the valve. Perhaps this need is best explained with reference to a specific intended application of valves in accordance with this invention.

These valves are primarily intended to be used in injecting quantities of liquids into flow passages or channels so that the injected liquids will react with other liquids moving through these flow channels. In recombinant DNA work it is quite important that none of the injected liquid remain in the outlet passage of a valve after the principal body of the liquid has been injected into this outlet passage. This is because of a possibility of any such remaining liquid interfering with intended subsequent reactions in the flow channel.

Presently known valves for use in injecting a first liquid into a second as indicated in the preceding are not considered to have been satisfactory in applications as indicated in this discussion because of a tendency for a comparatively small, nearly trace amount of the injected liquid to accumulate or be held in the extremely limited area or volume around the valve closure, closure member or plug generally between the interior of the outlet cavity of the valve. Such small amounts of liquid have tended to accumulate in prior valves because these prior valves have been shaped so as to have a comparatively dead space or volume generally around the closure member capable of retaining such limited amounts of liquid. As a consequence of this, it is considered that there is the need for valves which are constructed so as to avoid any such accumulations or which are constructed so that any such accumulations are so small as to, in effect, be non-existent.

BRIEF SUMMARY OF THE INVENTION

Broadly, the present invention is intended to provide new and improved valves. More specifically, it is intended to provide valves which are constructed in such a manner that there is substantially no chance for a liquid to be held or to accumulate around a closure member in a location where such liquid might possibly cause a degree of contamination in the outlet area or cavity of the valve. Other objects of the invention are to provide valves as indicated which may be easily and conveniently constructed at a comparatively nominal cost and which may be utilized in various intended applications for prolonged periods with substantially little or no maintenance.

In accordance with this invention, these objectives are achieved by providing a valve having a valve body shaped so as to include an inlet cavity, an outlet cavity an opening extending between said cavities and a valve seat located adjacent to and around said opening, said valve also having a closure member capable of seating against said seat when in a closed position so as to close off said opening, a stem extending from said closure member for use in supporting said closure member and in transmitting movement to said closure member and co-acting means connecting said valve body and said stem for use in moving said closure member between said closed position and an open position in which said closure member is spaced from said seat in which the improvement comprises: said body being shaped so that there is a smooth internal surface within said outlet cavity extending around said opening, said closure member being shaped so as to include a terminal surface which, when said closure member is in said closed position, appears as a continuation of the internal surface of said outlet cavity located around said opening, said terminal surface and said internal surface of said outlet cavity being shaped so that there is no space between said closure member and the interior of said outlet cavity in which material can accumulate or be held.

BRIEF DESCRIPTION OF THE DRAWINGS

Unfortunately, a summary such as the preceding inherently is incapable of fully and completely describing all aspects of a specific structure such as, for example, a valve of the present invention. Because of this, it is considered that the invention is best more fully described with reference to the accompanying drawing in which.

Figure 1:
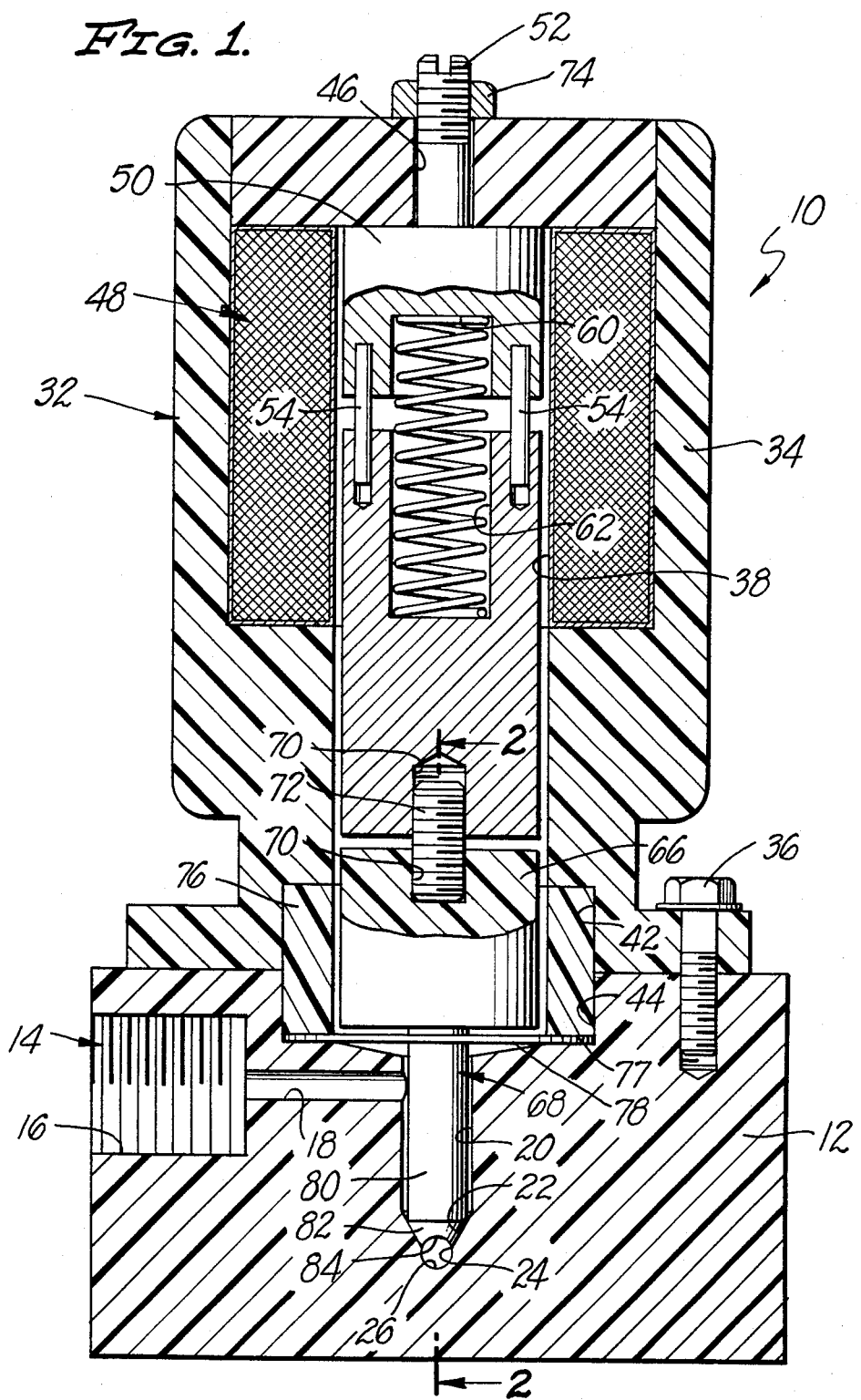
FIG. 1 is a partial cross-sectional view of a presently preferred embodiment or form of a valve of the present invention.

The various valves illustrated in the drawings are constructed so as to utilize the operative concepts or principals of the invention as set forth in the appended claims. These same concepts or principals can be utilized in many somewhat differently appearing and somewhat differently constructed valves through the use or exercise of routine engineering skill. For this reason, the present invention is not to be considered as being limited to structures directly corresponding to those illustrated and is to be considered as encompassing any specific valve coming within the scope of the appended claims.

DETAILED DESCRIPTION

Figure 2:
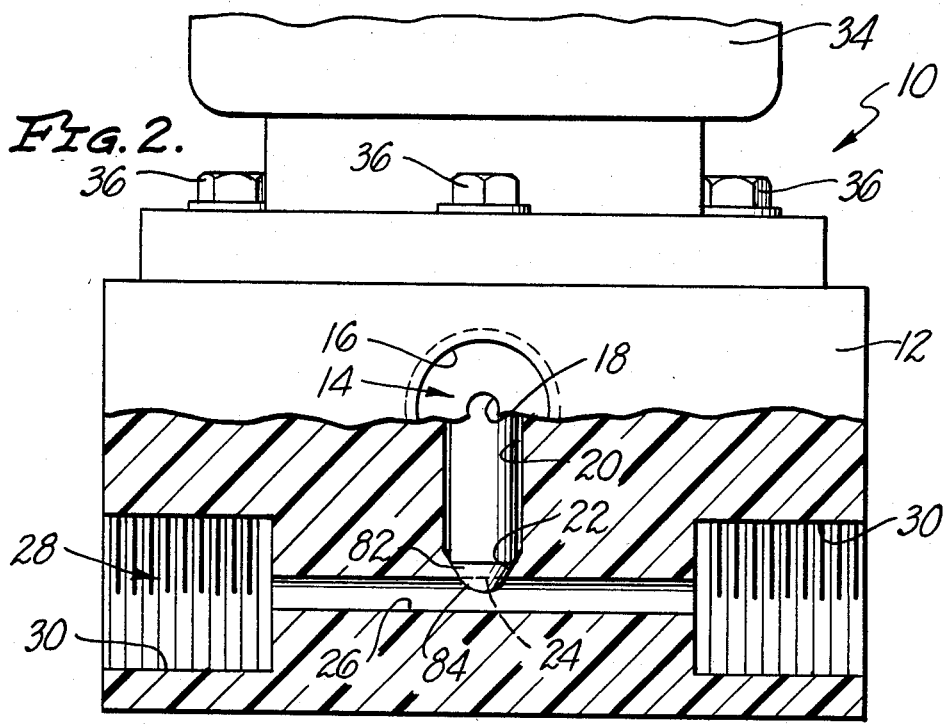
FIG. 2 is a partial cross-sectional view taken at line 2—2 of FIG. 1 in which many of the parts of the valve are illustrated in elevation.

In FIGS. 1 and 2 of the drawings there is shown a valve 10 which is constructed so as to utilize a valve body 12. The body 12 includes an inlet cavity 14 consisting of an internally tapped internal port 16 leading to a horizontally extending bore 18 which in turn leads to a vertically extending enlarged bore or passage 20 terminating in an upwardly flaring, beveled, conically shaped valve seat 22. The lower portion (unnumbered) of this valve seat 22 terminates at an opening 24 leading from the passage 20 into a horizontally extending bore 26 or passage forming a part of an outlet cavity 28. This cavity 28 has axially aligned internally threaded outlet ports 30 in communication with the bore 26.

The valve 10 also includes an actuator or actuating mechanism 32. In the particular valve 10 this actuator 32 includes a housing 34 which is normally secured to the body 12 by means of bolts 36. This housing 34 includes the centrally located, vertically extending plunger cavity 38 which is adapted to contain a solenoid plunger 40. This cavity 38 has an enlarged cylindrical lower end or cavity 42 which directly faces the body 12 and which is directly opposite an upper cylindrical cavity 44 in the body 12. The various cavities 38, 42 and 44 are actually aligned with one another and with the passage 20. In addition, they are axially aligned with another cylindrical hole 46 extending upwardly from the cavity 38 out of the housing 34. Within this housing 34 a conventional solenoid coil 48 is located generally around the cavity 38 in a conventional manner.

The plunger 40 is of a conventional or known construction. It consists of an upper cylinder 50 which carries a threaded shaft 52 so that this shaft 52 extends through from the hole 46. This cylinder 50 carries two pins 54 which extend parallel to the axis of the cavity 34 into correspondingly shaped holes 56 in a metal plunger body 58. These pins 54 are capable of sliding within these holes 56. The cylinder 50 and the body 58 both contain oppositely directed cavities 60 and 62, respectively, which are used so as to hold a small coil spring 64 so that it biases the cylinder 50 and the body 58 away from one another.

This plunger body 58 is also aligned with an upper cylinder 66 on what may be referred to as a composite unitary valve member 68. This cylinder 66 and the plunger body 58 both contain internally threaded cavities 70 which, in turn, are connected by a small threaded shaft 72. With this construction, the spacing between the cylinder 66 and the valve body 58 may be varied as desired by adjusting the position of a threaded shaft 52 which is normally held against rotation by a lock nut 74. This, of course, will result in some adjustment of the pressure exerted by the spring 64. Such adjustment may be required in order to obtain a desired movement of the plunger body 58 and the valve member 68 when the solenoid coil 48 is actuated or de-actuated.

In the valve 10 the two cavities 42 and 44 are held in alignment with one another by a short cylindrical sleeve 76. This sleeve 76 is preferrably press fitted into position so as to bear against the periphery 77 of an enlarged washer-like diaphragm 78 forming a part of the valve member 68. This diaphragm 78 extends outwardly from a stem 80. This diaphragm 78 serves several functions. One of them is to seal off the inlet cavity 14. This stem 80, in turn, extends downwardly from the cylinder 66 in axial alignment with the passage 20.

The lower end 82 of the stem 80 serves as a closure member and is shaped so as to fit tightly against the valve seat 22 when the valve 10 is in a closed position. This lower end 82 is provided with a terminal surface 84 which is shaped as a part of a cylinder having the same diameter as the bore 26. When the valve member 68 is in a closed position, this terminal surface 84 appears as an extension or continuation of the bore 26. With this construction, both the terminal surface 84 and the bore 26 are shaped so that when the valve 10 is closed there is no space between the lower end 82 and/or the terminal surface 84 and the bore 26 which will hold or accommodate any normally detectable amount of material or accumulation.

In order for the valve 10 to operate it is necessary to manufacture the valve member 68 out of a material which, when present in a body of a comparatively thin cross-section, is sufficiently flexible so as to accommodate movement of the lower end 82 from the closed position illustrated in FIGS. 1 and 2 to an open position in which the end 82 is spaced slightly from the valve seat 22. Further, it is considered necessary to form the valve member 68 of a material such that the end 82 will "seat" so as to form a seal against the valve seat 22. This sealing ability must, of course, be related to the materials utilized in the body 12 and in the valve seat 22.

At the present time, it is preferred to form both the body 12 and the valve member 68 of a comparative inert polymeric material. It is considered that best results are achieved when different polymeric materials are used in these two parts so that there will be at least a degree of cold flow or temporary defammation as a result of the pressure exerted by the spring 64 when the valve 10 is closed. At this time, it is considered that preferred results are achieved when the entire valve member 68 is formed out of polytetrafluoroethylene of a type commonly sold under the trademark TEFLON and when the valve body 12 is formed out of polytrifluorochloroethylene of a type commonly sold under the trademark KEL-F.

When the valve 10 is used, a current will, of course, be applied to the coil 48 so as to move the plunger body 58 and the connecting valve body 68 in order to space the end 22 from the valve seat 22. When the current is discontinued, the coil spring 64 will return the lower end 82 against the valve seat 22. It is quite important for the lower end 82 to move so that as to always fit relative to the bore 26 in the intended manner. Within the valve 10 this intended movement is accomplished by the diaphragm 78 serving to constrain the remainder of the valve member 68 against undesired movement. In effect, this diaphragm 78 serves as a guide or guide means controlling the movement of the stem 80 so that it is linear and so that the lower end 82 will move so as to obtain an intended "fit".

Figure 3:
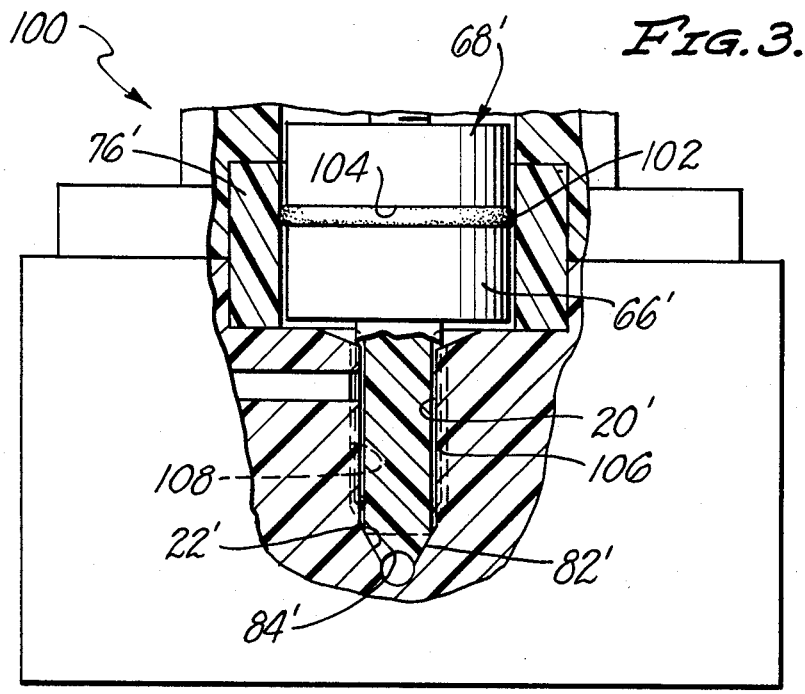
FIG. 3 is a partial cross-sectional view corresponding to a part of FIG. 1 showing a modified form of a valve of the present invention.

It will be obvious from the preceding that there are other ways of insuring that the lower end 82 will be returned to a desired position as the valve is closed. A structure 100 using a somewhat different construction for this purpose is illustrated in FIG. 3. Since this structure 100 is essentially the same as the previously described structure 10, various parts of the two structures which correspond to one another or which are substantially the same are not separately described herein and are indicated in the drawing and in the remainder of this specification by the primes of the numerals previously used to designate such parts.

In the valve 100 the sealing function of the diaphragm 78' is achieved through the use of a small O-ring 102 in a groove 104 in the cylinder 66'. This O-ring 102 resiliently bears against the sleeve 76' so as to form a seal therewith. Because the sleeve 76' is press fitted into position, no other seal is required in connection with it. In the valve 100 rotation of the valve member 68' is presented through the use of small linear projections 106 in the passage 20' which fit within grooves 108 in the stem 80'. Inasmuch as the projections 106 and the grooves 108 are parallel to the axis of the passage 20', they serve as co-acting guides or guide means 110 which insure that the lower end 82' will always seat against the valve seat 22' in such a manner as to avoid the presence of any dead space generally around this end 82' or the terminal surface 84'.

I claim:

1. A valve having a valve body shaped so as to include an inlet cavity, an outlet cavity an opening extending between said cavities and a valve seat located adjacent to and around said opening, said valve also having a closure member capable of seating against said seat when in a closed position so as to close off said opening, a stem extending from said closure member for use in supporting said closure member and in transmitting movement to said closure member and co-acting means connecting said valve body and said stem for use in moving said closure member between said closed position and an open position in which said closure member is spaced from said seat in which the improvement comprises:

said body being shaped so that there is a smooth internal surface within said outlet cavity extending around said opening, said closure member being shaped so as to include a terminal surface which, when said closure member is in said closed position, appears as a continuation of the internal surface of said outlet cavity located around said opening, said terminal surface and said internal surface of said outlet cavity being shaped so that there is no space between said closure member and the interior of said outlet cavity in which material can accumulate or be held, said seat is beveled so as to open outwardly into the interior of said inlet cavity, said closure member has a beveled surface which seats against said valve seat, said outlet chamber includes a cylindrical bore which is separated from said inlet cavity by said opening, said terminal surface is a cylindrical surface having the same diameter as said cylindrical bore, and including guide means for controlling the motion of said valve closure member so that said closure member can only seat against said valve seat in a position which said cylindrical surface appears as a continuation of said cylindrical bore, said closure member and said valve seat are both formed of normally inert materials one of which is softer than the other, said co-acting means includes spring means for biasing said closure member against said valve seat, said spring means being capable of exerting sufficient force so as to cause deformation of the softer of said materials in forming a seal, and said guide means comprises a flexible diaphragm which extends outwardly from said stem around said stem and which has a periphery, said periphery being held against said body so as to seal off the interior of said inlet cavity.

2. A valve having a valve body shaped so as to include an inlet cavity, an outlet cavity an opening extending between said cavities and a valve seat located adjacent to and around said opening, said valve also having a closure member capable of seating against said seat when in a closed position so as to close off said opening, a stem extending from said closure member for use in supporting said closure member and in transmitting movement to said closure member and co-acting means connecting said valve body and said stem for use in moving said closure member between said closed position and an open position in which said closure member is spaced from said seat in which the improvement comprises:

said body being shaped so that there is a smooth internal surface within said outlet cavity extending around said opening, said closure member being shaped so as to include a terminal surface which, when said closure member is in said closed position, appears as a continuation of the internal surface of said outlet cavity located around said opening, said terminal surface and said internal surface of said outlet cavity being shaped so that there is no space between said closure member and the interior of said outlet cavity in which material can accumulate or be held, said seat is beveled so as to open outwardly into the interior of said inlet cavity, said closure member has a beveled surface which seats against said valve seat, said outlet chamber includes a cylindrical bore which is separated from said inlet cavity by said opening, said terminal surface is a cylindrical surface having the same diameter as said cylindrical bore, and including guide means for controlling the motion of said valve closure member so that said closure member can only seat against said valve seat in a position which said cylindrical surface appears as a continuation of said cylindrical bore, said closure member and said valve seat are both formed of normally inert materials one of which is softer than the other, said co-acting means includes spring means for biasing said closure member against said valve seat, said spring means being capable of exerting sufficient force so as to cause deformation of the softer of said materials in forming a seal, and said guide means comprises a flexible diaphragm which extends outwardly from said stem around said stem and which has a periphery, said periphery being held against said body so as to seal off the interior of said inlet cavity, said valve body including said valve seat is formed of a polytrifluorochloroethylene and said closure member is formed of polytetrafluoroethylene, said diaphragm being integral with said closure member.

* * * * *